United States Patent
Mc Lain et al.

(10) Patent No.: US 7,644,608 B2
(45) Date of Patent: Jan. 12, 2010

(54) INTAKE AIR TEMPERATURE SENSOR DIAGNOSTIC

(75) Inventors: Kurt D. Mc Lain, Clarkston, MI (US); Wenbo Wang, Novi, MI (US); John F. Van Gilder, Webberville, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 12/116,360

(22) Filed: May 7, 2008

(65) Prior Publication Data

US 2009/0100921 A1 Apr. 23, 2009

Related U.S. Application Data

(60) Provisional application No. 60/981,267, filed on Oct. 19, 2007.

(51) Int. Cl.
*G01M 15/00* (2006.01)
(52) U.S. Cl. .................................................. 73/114.31
(58) Field of Classification Search .............. 73/114.31; 701/29, 34; 702/99
See application file for complete search history.

(56) References Cited

U.S. PATENT DOCUMENTS

| | | | | |
|---|---|---|---|---|
| 5,848,381 A | * | 12/1998 | Ishii et al. ..................... | 702/99 |
| 5,884,243 A | * | 3/1999 | Taniguchi et al. ............ | 702/183 |
| 6,684,154 B2 | * | 1/2004 | Isobe et al. ................... | 701/114 |
| 6,701,232 B2 | * | 3/2004 | Yamaki ........................ | 701/33 |
| 6,908,225 B2 | * | 6/2005 | Tsukamoto et al. ............ | 374/1 |
| 7,239,946 B2 | * | 7/2007 | Sowa ........................... | 701/29 |
| 7,324,398 B2 | * | 1/2008 | Shim et al. .................... | 365/212 |
| 7,369,937 B1 | * | 5/2008 | Wang et al. ................... | 701/114 |
| 7,418,322 B2 | * | 8/2008 | Kariya et al. ................. | 701/34 |
| 7,429,128 B2 | * | 9/2008 | Izumiura et al. ............. | 374/144 |
| 7,445,383 B2 | * | 11/2008 | Huttenlocher et al. ....... | 374/137 |
| 2003/0009276 A1 | * | 1/2003 | Isobe et al. ................... | 701/114 |
| 2008/0052042 A1 | * | 2/2008 | Mc Lain et al. .............. | 702/185 |
| 2008/0229727 A1 | * | 9/2008 | Wang et al. ................... | 60/273 |
| 2008/0319600 A1 | * | 12/2008 | McLain et al. ................ | 701/29 |
| 2009/0078033 A1 | * | 3/2009 | Iwai ........................ | 73/114.34 |

* cited by examiner

*Primary Examiner*—Lisa M Caputo
*Assistant Examiner*—Freddie Kirkland, III
(74) *Attorney, Agent, or Firm*—Harness, Dickey & Pierce, P.L.C.

(57) ABSTRACT

An intake air temperature (IAT) sensor diagnostic module comprises a measured noise module, an expected noise module, an excess noise module, and an IAT fault detection module. The measured noise module measures noise in an IAT signal from an IAT sensor in a vehicle. The expected noise module determines expected noise based upon the IAT signal. The excess noise module determines an excess noise value based upon the measured noise and the expected noise. The IAT fault detection module diagnoses faults in the IAT sensor based upon a comparison of the excess noise value and a first predetermined value.

16 Claims, 5 Drawing Sheets

INTAKE AIR TEMPERATURE SENSOR DIAGNOSTIC

CROSS-REFERENCE

This application claims the benefit of U.S. Provisional Application No. 60/981,267, filed on Oct. 19, 2007. The disclosure of the above application is incorporated herein by reference.

FIELD

The present disclosure relates to internal combustion engines and more particularly to intake air temperature sensor diagnostics.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an engine system 100 is presented. Air is drawn into an engine 102 through an intake line 104 and an intake manifold 106. A throttle valve 108 is actuated by an electronic throttle control (ETC) motor 109 to vary the volume of air drawn into the engine 102.

The air mixes with fuel from one or more fuel injectors 110 to form an air-fuel mixture. The air-fuel mixture is combusted within one or more cylinders 112 of the engine 102. Although the fuel injector 110 is shown as injecting fuel into the cylinders 112, fuel may be injected at any suitable location, such as into the intake line 104 or the intake manifold 106. Resulting exhaust gas is expelled from the cylinders 112 to an exhaust system 114. The combustion of the air-fuel mixture generates torque.

An intake air temperature (IAT) sensor 116 measures intake air temperature at any suitable point in the air intake system, such as in the intake line 104 or the intake manifold 106. An engine control module (ECM) 120 receives an IAT signal from the IAT sensor 116 and may receive signals from other sensors 122. The other sensors 122 may include, for example, a mass air flow (MAF) sensor, a manifold absolute pressure (MAP) sensor, and/or one or more throttle position sensors (TPS). The ECM 120 controls the air-fuel mixture based upon the received signals via, for example, the throttle valve 108 and/or the fuel injectors 110.

SUMMARY

An intake air temperature (IAT) sensor diagnostic module comprises a measured noise module, an expected noise module, an excess noise module, and an IAT fault detection module. The measured noise module measures noise in an IAT signal from an IAT sensor in a vehicle. The expected noise module determines expected noise based upon the IAT signal. The excess noise module determines an excess noise value based upon the measured noise and the expected noise. The IAT fault detection module diagnoses faults in the IAT sensor based upon a comparison of the excess noise value and a first predetermined value.

In other features, the expected noise module comprises a lookup table of expected noise indexed by IAT signal, and the expected noise module determines the expected noise based upon the IAT signal and the lookup table. In still other features, the expected noise module comprises a filter module that filters the IAT signal, and the expected noise module determines the expected noise based upon the filtered IAT signal. The filter module comprises a first order lag filter.

In further features, the IAT sensor diagnostic module further comprises a comparison module. The comparison module compares the excess noise value with the first predetermined value, generates one of a first signal and a second signal based upon the comparison, and generates the first signal when the excess noise value is greater than the first predetermined value.

In still further features, the IAT sensor diagnostic module further comprises a counter module having a first counter that is incremented when the first signal is generated. The IAT fault detection module selectively indicates faults in the IAT sensor when the first counter is greater than a second predetermined value.

In other features, the counter module further comprises a second counter that is incremented when either of the first and the second signals is generated. The IAT fault detection module waits to diagnose faults in the IAT sensor until the second counter is equal to a third predetermined value. The first counter and the second counter are reset after the second counter is equal to the third predetermined value.

A method comprises measuring noise in an IAT signal from an IAT sensor in a vehicle, determining expected noise based upon the IAT signal, determining an excess noise value based upon the measured noise and the expected noise, and diagnosing faults in the IAT sensor based upon a comparison of the excess noise value and a first predetermined value.

In other features, the method further comprises determining the expected noise further based upon a lookup table of expected noise indexed by IAT signal. In still other features, the method further comprises filtering the IAT signal and determining the expected noise based upon the filtered IAT signal. In further features, the filtering comprises applying a first order lag filter.

In other features, the method further comprises comparing the excess noise value and the first predetermined value, generating one of a first signal and a second signal based upon the comparison, and generating the first signal when the excess noise value is greater than the first predetermined value.

In further features, the method further comprises incrementing a first counter when the first signal is generated and selectively indicating faults in the IAT sensor when the first counter is greater than a second predetermined value. The method further comprises incrementing a second counter when either of the first and the second signals is generated and waiting to diagnose faults in the IAT sensor until the second counter is equal to a third predetermined value. The method further comprises resetting the first counter and the second counter after the second counter is equal to the third predetermined value.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
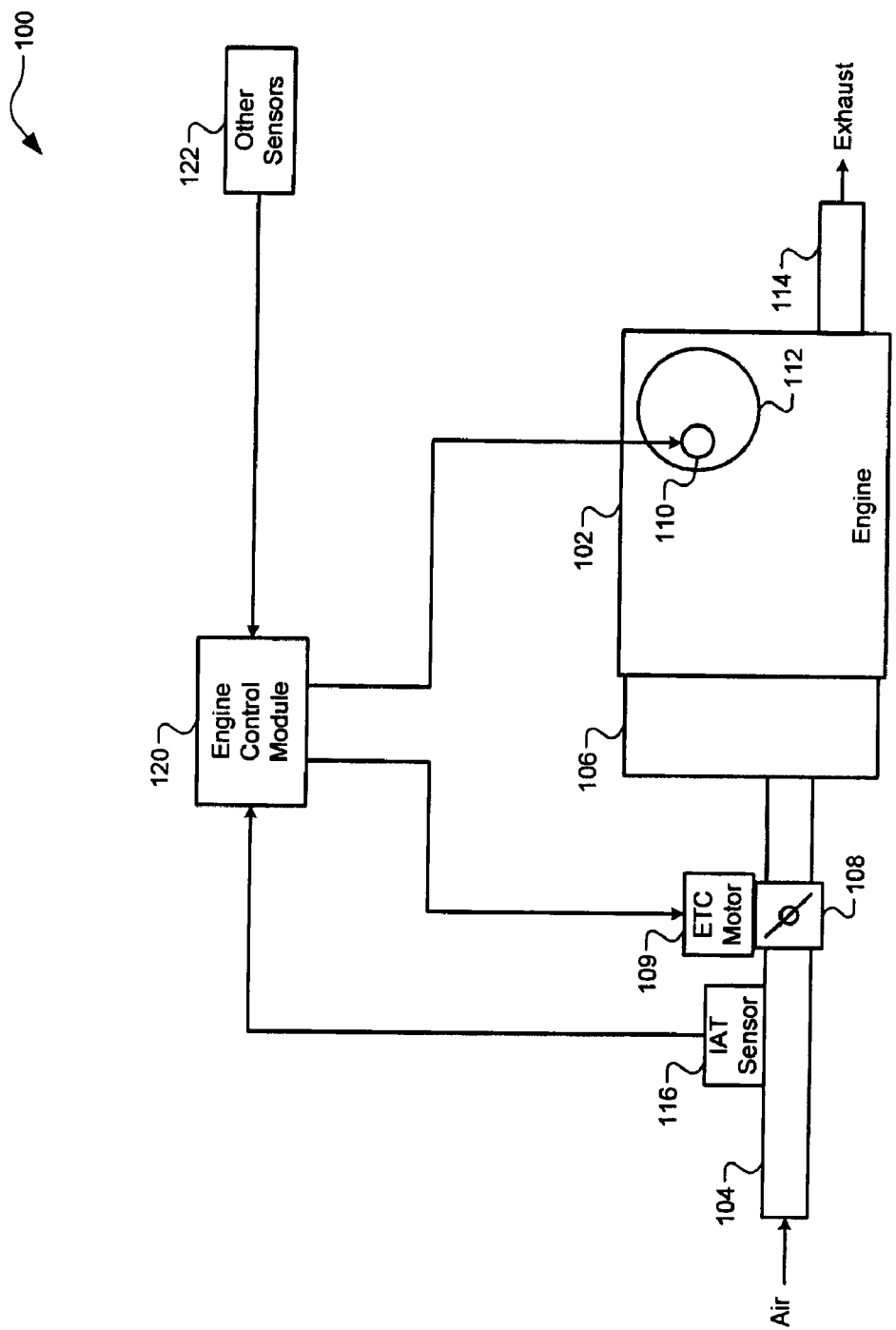
FIG. 1 is a functional block diagram of an engine system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Controlling an engine based upon an intake air temperature (IAT) signal from a faulty IAT sensor may cause unexpected increases or decreases in torque production and/or increases in emissions. An IAT sensor is likely faulty when the IAT signal is outside an operating range of the IAT sensor. However, the IAT sensor may be faulty despite the IAT signal falling within the operating range. In such cases, a noisy IAT signal may indicate fault in the IAT sensor. Some noise, however, may be expected even from a reliable IAT sensor. Fault in the IAT sensor may therefore be diagnosed based upon the amount of noise in the IAT signal in excess of the expected noise.

Figure 2:
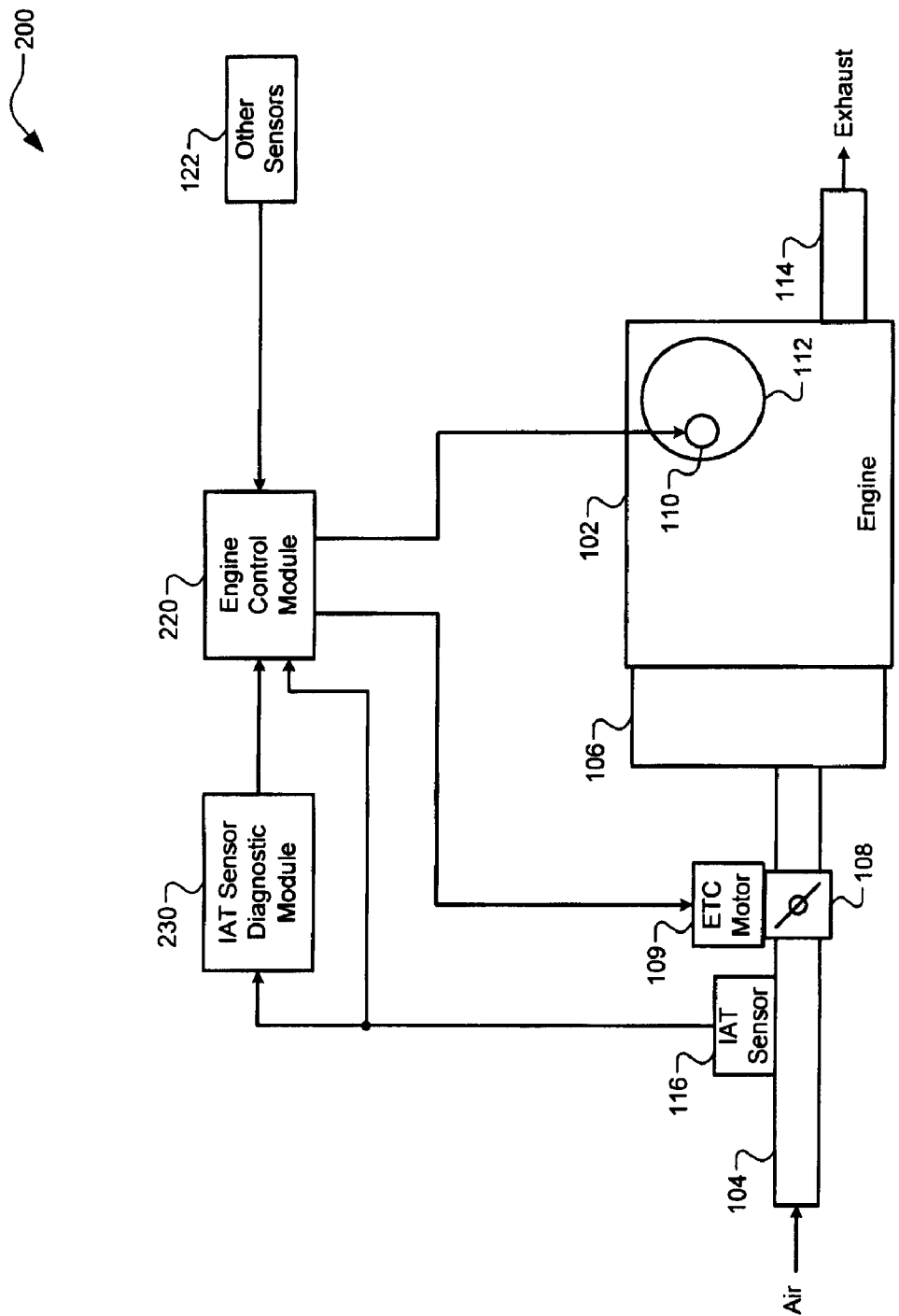
FIG. 2 is a functional block diagram of an exemplary engine system according to the principles of the present disclosure.

Referring now to FIG. 2, a functional block diagram of an exemplary engine system 200 is presented. The engine 102 may be any suitable type of internal combustion engine, such as a spark ignition type engine or a compression ignition type engine. The IAT sensor 116 generates an IAT signal, which may have been digitized by an analog-to-digital converter (ADC). Accordingly, the IAT signal may include digital values that correspond to intake air temperatures. Although the IAT signal will be discussed below as a digital signal, the IAT signal may be an analog signal.

IAT has an inverse relationship with air density. Air density has a direct relationship with the amount of fuel necessary to produce a desired air-fuel ratio, such as a stoichiometric ratio. Accordingly, IAT has an inverse relationship with the amount of fuel necessary to produce the stoichiometric air-fuel ratio. For example only, for a given volume of air, as IAT increases, the amount of fuel necessary to produce the stoichiometric air-fuel ratio decreases.

An engine control module (ECM) 220 may control the air-fuel ratio based upon the IAT signal and/or signals from the other sensors 122. For example only, the ECM 220 may control the air-fuel ratio by controlling the fuel injectors 110 and/or the throttle valve 108. The IAT signal of a faulty IAT sensor may be noisy. This noise may cause the ECM 220 to provide an incorrect (e.g., non-stoichiometric) air-fuel ratio. Accordingly, fault in the IAT sensor 116 may cause an increase or decrease in torque production and/or an increase in emissions of the engine 102.

The IAT signal may be expected to include some noise. For example only, the expected noise in the IAT signal may increase as the IAT approaches the limits of the operating temperature range of the IAT sensor 116. This noise may be attributable to the quantization (digitization) of the IAT signal. More specifically, the IAT signal may be digitized by, for example, a non-linear ADC having a predetermined number of discrete values. The spacing between these discrete values may increase as the IAT approaches the limits of the operating temperature range. Accordingly, near the limits of the operating temperature range, small fluctuations in IAT may result in significant changes in the IAT signal.

An IAT sensor diagnostic module 230 measures noise present in the IAT signal and determines expected noise of the IAT signal. The IAT sensor diagnostic module 230 determines excess noise of the IAT signal based upon the measured noise and the expected noise. The IAT sensor diagnostic module 230 diagnoses fault in the IAT sensor 116 based upon the magnitude of the excess noise and generates an IAT fault signal accordingly. The IAT fault signal indicates whether fault has been detected in the IAT sensor 116. The IAT sensor diagnostic module 230 may also indicate fault in the IAT sensor 116 when the IAT signal is outside the operating range of the IAT sensor 116.

The ECM 220 may take remedial action when fault is detected in the IAT sensor 116. For example only, when fault is detected the ECM 220 may control the engine 102 based upon a modeled value of IAT and/or a secondary IAT sensor (not shown). Additionally, the ECM 220 may, for example, illuminate a "check engine light" and/or set an error flag when fault in the IAT sensor 116 is detected.

Figure 3:
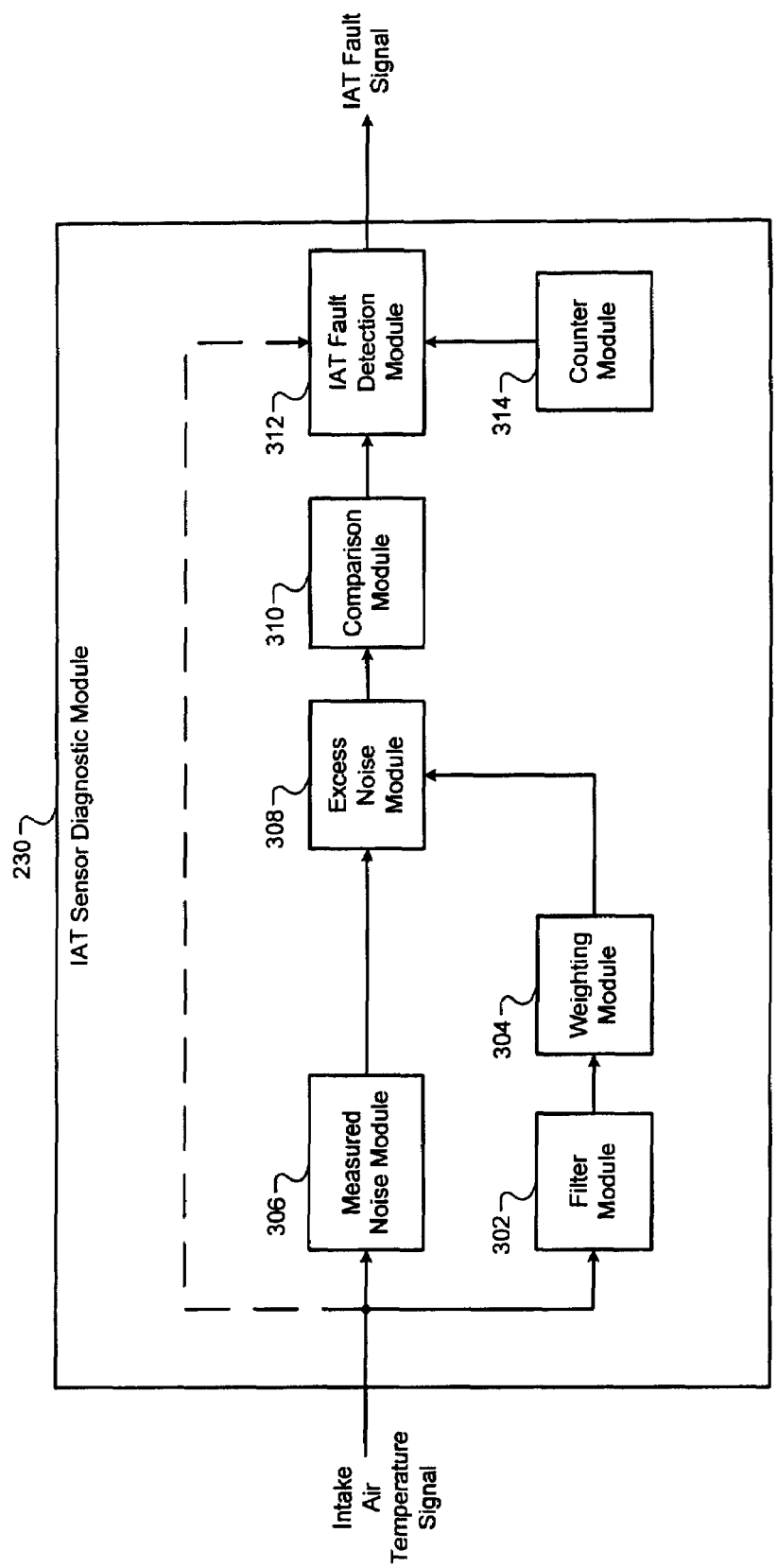
FIG. 3 is a functional block diagram of an exemplary implementation of an intake air temperature sensor (IAT) diagnostic module according to the principles of the present disclosure.

Referring now to FIG. 3, a functional block diagram of an exemplary implementation of the IAT sensor diagnostic module 230 is presented. In various implementations, the IAT sensor diagnostic module 230 includes a filter module 302, a weighting module 304, a measured noise module 306, an excess noise module 308, a comparison module 310, an IAT fault detection module 312, and a counter module 314.

The operating temperature range may be segmented into temperature bins, which are indicative of where an IAT lies within the operating temperature range. The filter module 302 provides a filtered IAT signal, which can be used to correlate the IAT signal with one of the temperature bins. The filter may be a low-pass filter or any other suitable filter. The filter module 302 enhances system stability in this correlation process.

In various implementations, the filter module 302 may include a first order lag filter, which may be described as:

$$\text{Filtered IAT} = \text{Out} + (\text{In} - \text{Out}) \times FC$$

where Out is the previous output of the filter, In is the current input to the filter, and FC is the filter coefficient. The filter coefficient may be calibratable, and may be, for example, 0.1.

The weighting module 304 determines a weighting factor based upon the filtered IAT. The weighting factor (e.g., 0.0-1.0) corresponds to the expected noise in the temperature bin that corresponds to the filtered IAT. In various implementations, the weighting module 304 may determine the weighting factor from a lookup table, which maps temperature bin to weighting factor.

The measured noise module 306 receives the IAT signal from the IAT sensor 116 and measures the noise present in the IAT signal. For example only, the measured noise may be calculated using the equation:

$$\text{Measured Noise} = \frac{|IAT_2 - IAT_1|}{t}$$

where $IAT_2$ is a current IAT value, $IAT_1$ is a previous IAT value, and t is the length of time between $IAT_2$ and $IAT_1$. In various implementations, $IAT_1$ may be the IAT value that is received before $IAT_2$.

The excess noise module 308 determines the excess noise present in the IAT signal based upon the measured noise and the weighting factor. In various implementations, the excess noise module 308 may be a multiplier, and the excess noise may be the measured noise multiplied by the weighting factor.

The comparison module 310 compares the excess noise with a first threshold and determines whether the IAT signal is noisy based upon the comparison. The first threshold may be set to, for example, a maximum amount of excess noise allowable for a reliable IAT sensor. The comparison module 310 generates a sample signal, which indicates whether the IAT signal is noisy. For example only, the comparison module 310 may indicate, via the sample signal, that the IAT signal is noisy when the excess noise is greater than the first threshold.

A counter in the counter module 314 is incremented each time the sample signal is generated and is referred to as a total counter. The total counter tracks the number of sample signals generated. The counter module 314 may also include one or more additional counters, such as a noisy sample counter. The noisy sample counter is incremented each time that the sample signal indicates that the IAT signal is noisy. Accordingly, the noisy sample counter tracks the number of sample signals that indicate that the IAT signal is noisy.

The IAT fault detection module 312 may diagnose fault in the IAT sensor 116 once the total counter is equal to a second threshold. The second threshold may be calibratable and may be, for example, 200. The IAT fault detection module 312 diagnoses fault in the IAT sensor 116 based upon a comparison of the noisy sample counter with a third threshold. The third threshold may be calibratable and may be set to, for example, 150. For example only, the IAT fault detection module 312 may detect fault in the IAT sensor 116 when the noisy sample counter is greater than the third threshold. The IAT fault detection module 312 generates the IAT fault signal based upon this comparison.

In various implementations, the IAT fault detection module 312 may indicate fault in the IAT sensor 116 without waiting for the total counter to reach the second threshold. Additionally, the IAT fault detection module 312 may receive the IAT signal and indicate fault in the IAT sensor 116 when the IAT signal is outside the operating range of the IAT sensor 116.

Figure 4A:
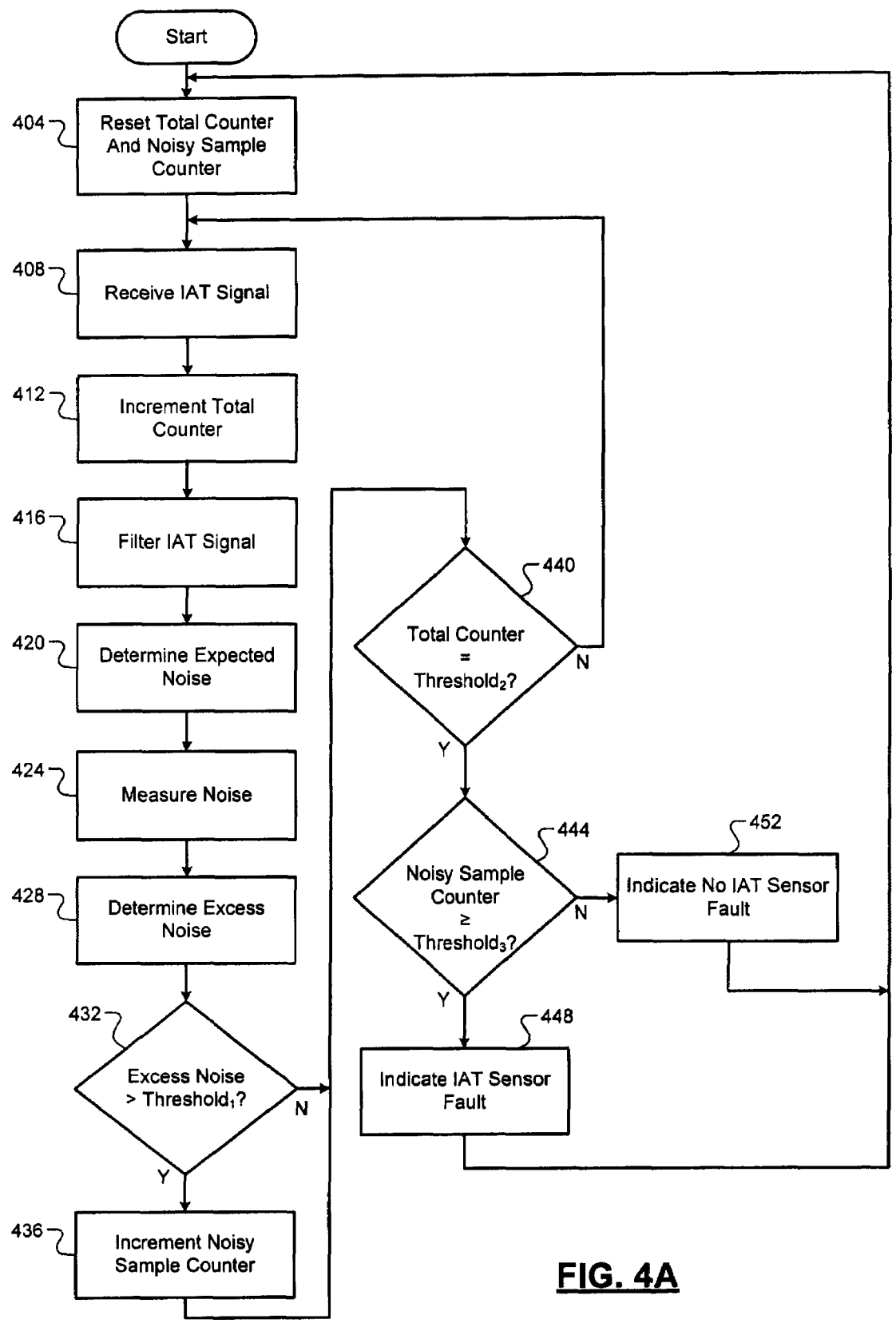
FIGS. 4A-4B are flowcharts depicting exemplary steps performed by IAT diagnostic modules according to the principles of the present disclosure.

Referring now to FIG. 4A, a flowchart depicting exemplary steps performed by the IAT sensor diagnostic module 230 is presented. Control begins, for example, upon starting the engine 102. In step 404, control resets the total counter and the noisy sample counter. Control may reset the total counter and the noisy sample counter to a predetermined reset value, such as zero. Control continues in step 408 where control receives the IAT signal. Control continues in step 412 where control increments the total counter.

In step 416, control applies a filter to the IAT signal, thereby providing the filtered IAT signal. For example, control may apply a low-pass filter, a first order lag filter, or any other suitable filter. Control continues in step 420 where control determines the expected noise of the IAT signal. Control may determine the expected noise based upon, for example, the temperature bin that corresponds to the filtered IAT signal. For example only, the expected noise may increase as the IAT approaches the limits of the operating temperature range of the IAT sensor 116.

Control continues in step 424 where control measures the noise present in the IAT signal. For example only, control may calculate the measured noise using the equation:

$$\text{Measured Noise} = \frac{|IAT_2 - IAT_1|}{t}$$

where $IAT_2$ is the current IAT value, $IAT_1$ is the previous IAT value, and t is the length of time between $IAT_2$ and $IAT_1$. In various implementations, $IAT_1$ may be the IAT value that is received before $IAT_2$.

Control determines the excess noise present in the IAT signal in step 428. Control determines the excess noise based upon the measured noise and the expected noise. In step 432, control determines whether the excess noise is greater than the first threshold. If so, control continues in step 436; otherwise, control transfers to step 440.

Control increments the noisy sample counter in step 436. The noisy sample counter tracks the number of times the IAT signal has been determined to be noisy. In step 440, control determines whether the total counter is equal to the second threshold. If so, control continues in step 444; otherwise, control returns to step 408. In this manner, control waits to diagnose fault in the IAT sensor 116 until a predetermined number of IAT signals have been received.

In step 444, control determines whether the noisy sample counter is greater than or equal to the third threshold. If so, control continues in step 448; otherwise, control transfers to step 452. In step 448, control indicates fault in the IAT sensor 116 and control returns to step 404. In step 452, control indicates that fault has not been detected in the IAT sensor 116 and control returns to step 404.

Figure 4B:
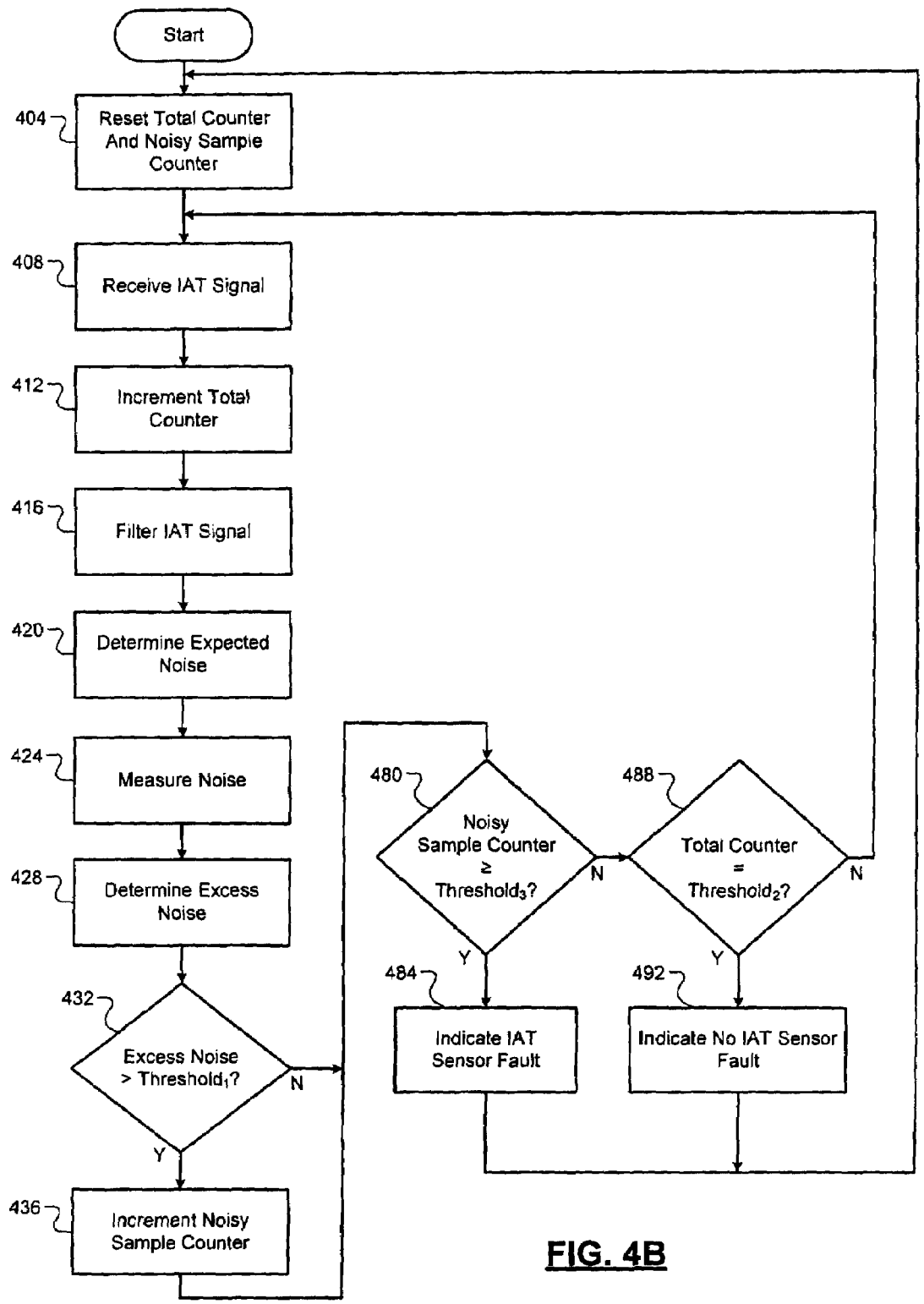

Referring now to FIG. 4B, another flowchart depicting exemplary steps performed by the IAT sensor diagnostic module 230 is presented. Control may be similar to that of FIG. 4A until step 432. In step 432, control determines whether the excess noise is greater than the first threshold. If so, control continues in step 436; otherwise, control transfers to step 480.

Control increments the noisy sample counter in step 436, and control continues in step 480. In step 480, control determines whether the noisy sample counter is greater than or equal to the third threshold. If so, control continues in step 484; otherwise, control transfers to step 488. In step 484, control indicates fault in the IAT sensor 116 and control returns to step 404. In this manner, control may indicate fault in the IAT sensor 116 before the total counter is equal to the second threshold.

In step 488, control determines whether the total counter is equal to the second threshold. If so, control continues in step 492; otherwise, control returns to step 408. In step 492, control indicates that no fault has been detected in the IAT sensor 116, and control returns to step 404. In this manner, control may indicate that no fault has been detected only once the total counter is equal to the second threshold.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An intake air temperature (IAT) sensor diagnostic module comprising:
   a measured noise module that receives an IAT signal from an IAT sensor in a vehicle and that determines an amount of noise present in said IAT signal;
   an expected noise module that determines expected noise based upon said IAT signal;
   an excess noise module that determines an excess noise value based upon said amount of noise and said expected noise; and an IAT fault detection module that diagnoses faults in said IAT sensor based upon a comparison of said excess noise value and a first predetermined value.

2. The IAT sensor diagnostic module of claim 1 wherein said expected noise module comprises a lookup table of expected noise indexed by IAT signal, and
wherein said expected noise module determines said expected noise further based upon said lookup table.

3. The IAT sensor diagnostic module of claim 1 wherein said expected noise module comprises a filter module that filters said IAT signal, and
wherein said expected noise module determines said expected noise based upon said filtered IAT signal.

4. The IAT sensor diagnostic module of claim 3 wherein said filter module comprises a first order lag filter.

5. The IAT sensor diagnostic module of claim 1 further comprising a comparison module that compares said excess noise value and said first predetermined value and that generates one of a first signal and a second signal based upon said comparison,
wherein said comparison module generates said first signal when said excess noise value is greater than said first predetermined value.

6. An intake air temperature (IAT) sensor diagnostic module comprising:
a measured noise module that measures noise in an IAT signal from an IAT sensor in a vehicle;
an expected noise module that determines expected noise based upon said IAT signal;
an excess noise module that determines an excess noise value based upon said measured noise and said expected noise;
an IAT fault detection module that diagnoses faults in said IAT sensor based upon a comparison of said excess noise value and a first predetermined value;
a comparison module that compares said excess noise value and said first predetermined value and that generates one of a first signal and a second signal based upon said comparison,
wherein said comparison module generates said first signal when said excess noise value is greater than said first predetermined value; and
a counter module having a first counter that is incremented when said first signal is generated,
wherein said IAT fault detection module selectively indicates faults in said IAT sensor when said first counter is greater than a second predetermined value.

7. The IAT sensor diagnostic module of claim 6 wherein said counter module further comprises a second counter that is incremented when either of said first and said second signals is generated, and
wherein said IAT fault detection module waits to diagnose faults in said IAT sensor until said second counter is equal to a third predetermined value.

8. The IAT sensor diagnostic module of claim 7 wherein said first counter and said second counter are reset after said second counter is equal to said third predetermined value.

9. A method comprising:
receiving an IAT signal from an IAT sensor in a vehicle;
determining an amount of noise present in said IAT signal;
determining expected noise based upon said IAT signal;
determining an excess noise value based upon said measured amount of noise and said expected noise; and
diagnosing faults in said IAT sensor based upon a comparison of said excess noise value and a first predetermined value.

10. The method of claim 9 further comprising determining said expected noise further based upon a lookup table of expected noise indexed by IAT signal.

11. The method of claim 9 further comprising:
filtering said IAT signal; and
determining said expected noise based upon said filtered IAT signal.

12. The method of claim 11 wherein said filtering comprises applying a first order lag filter.

13. The method of claim 9 further comprising:
comparing said excess noise value and said first predetermined value; and
generating one of a first signal and a second signal based upon said comparison,
wherein said first signal is generated when said excess noise value is greater than said first predetermined value.

14. A method comprising:
measuring noise in an IAT signal from an IAT sensor in a vehicle;
determining expected noise based upon said IAT signal;
determining an excess noise value based upon said measured noise and said expected noise;
diagnosing faults in said IAT sensor based upon a comparison of said excess noise value and a first predetermined value;
comparing said excess noise value and said first predetermined value;
generating one of a first signal and a second signal based upon said comparison,
wherein said first signal is generated when said excess noise value is greater than said first predetermined value;
incrementing a first counter when said first signal is generated; and
selectively indicating faults in said IAT sensor when said first counter is greater than a second predetermined value.

15. The method of claim 14 further comprising:
incrementing a second counter when either of said first and said second signals is generated; and
waiting to diagnose faults in said IAT sensor until said second counter is equal to a third predetermined value.

16. The method of claim 15 further comprising resetting said first counter and said second counter after said second counter is equal to said third predetermined value.

* * * * *